(12) United States Patent
Yamakawa

(10) Patent No.: US 8,770,054 B2
(45) Date of Patent: Jul. 8, 2014

(54) MANUFACTURING METHOD FOR HOLLOW RACK SHAFT, AND HOLLOW RACK SHAFT

(75) Inventor: Tomonari Yamakawa, Hoi-gun (JP)

(73) Assignee: Jtekt Corporation, Osaka-Shi (JP)

( * ) Notice: Subject to any disclaimer, the term of this patent is extended or adjusted under 35 U.S.C. 154(b) by 479 days.

(21) Appl. No.: 12/961,775

(22) Filed: Dec. 7, 2010

(65) Prior Publication Data

US 2011/0138946 A1 Jun. 16, 2011

(30) Foreign Application Priority Data

Dec. 14, 2009 (JP) ................................. 2009-282698

(51) Int. Cl.
 *F16H 55/26* (2006.01)
 *B21K 1/76* (2006.01)
(52) U.S. Cl.
 CPC ................ *B21K 1/768* (2013.01); *F16H 55/26* (2013.01)
 USPC .......................... 74/422; 74/89.17; 72/370.19
(58) Field of Classification Search
 CPC ........ B21K 1/767; B21K 1/768; B62D 3/126; F16H 55/26
 USPC ............... 74/422, 89.17; 72/370.19
 See application file for complete search history.

(56) References Cited

U.S. PATENT DOCUMENTS

| 4,133,221 A | * | 1/1979 | Clary ............................ 74/498 |
| 2008/0184833 A1 | * | 8/2008 | Dohmann ....................... 74/422 |
| 2009/0260467 A1 | | 10/2009 | Kobayashi et al. |

FOREIGN PATENT DOCUMENTS

| EP | 1 092 610 A2 | 4/2001 |
| JP | A 59-092141 | 5/1984 |
| JP | A-2001-114114 | 4/2001 |
| JP | 2002086243 A * | 3/2002 ............... B21K 1/76 |
| JP | A-2007-105751 | 4/2007 |
| JP | A-2009-264452 | 11/2009 |

OTHER PUBLICATIONS

Translation of Japanese Office Action issued in Japanese Patent Application No. 2009-282698 dated Dec. 3, 2013.

* cited by examiner

*Primary Examiner* — David M Fenstermacher
*Assistant Examiner* — Terence Boes
(74) *Attorney, Agent, or Firm* — Oliff PLC

(57) ABSTRACT

In a manufacturing method for a hollow rack shaft, and a hollow rack shaft, a tubular member (23) having a planar flat portion (22) that is formed in part of a tubular body portion (21) is sandwiched and held between a cope (25) and a drag (26) that has a tooth-shaped portion (29) substantially symmetrical with rack teeth (7) so that a surface (22a) of the flat portion (22) is in contact with the tooth-shaped portion (29). A back die (14) having a plurality of protrusions (15) is arranged so that the protrusions (15) face groove portions (29a) of the tooth-shaped portion (29) across the flat portion (22), and the back die (14) is pressed against the flat portion (22) to form the rack teeth (7) to thereby manufacture the rack shaft.

5 Claims, 9 Drawing Sheets

MANUFACTURING METHOD FOR HOLLOW RACK SHAFT, AND HOLLOW RACK SHAFT

INCORPORATION BY REFERENCE

The disclosure of Japanese Patent Application. No. 2009-282698 filed on Dec. 14, 2009 including the specification, drawings and abstract, is incorporated herein by reference in its entirety.

BACKGROUND OF THE INVENTION

1. Field of the Invention

The invention relates to a manufacturing method for a hollow rack shaft, and a hollow rack shaft.

2. Description of the Related Art

In an existing steering system, rotation of a steering shaft resulting from steering operation is converted to reciprocating movement of a rack shaft by a rack and pinion mechanism to thereby change the steered angle of steered wheels, that is, the traveling direction of a vehicle. In such a steering system, in recent years, what is called hollow rack shaft that is obtained by forming a rack shaft in a hollow shape is used in order to reduce the weight, or the like.

As a manufacturing method for such a hollow rack shaft, there is known a manufacturing method in which a tubular member is used as a raw martial and the tubular member is plastically deformed to form rack teeth. For example, Japanese Patent Application Publication No, 59-92141 (JP-A-59-92141) describes a method in which a first mandrel having a plurality of protrusions and a substantially semi-cylindrical second mandrel are inserted into a tubular member and then the tubular member is subjected to pressing using a die that has a tooth-shaped portion substantially symmetrical with rack teeth to thereby form the rack teeth to manufacture a rack shaft.

However, in the manufacturing method for a hollow rack shaft, described in JP-A-59-92141, as shown in FIG. 17, the tooth-shaped portion 72 formed in the die 71 is pressed against the tubular member 75 in which the first mandrel 73 and the second mandrel 74 are inserted to thereby form rack teeth. That is, by pushing portions that become groove portions of the rack teeth toward an inner surface 75b of the tubular member 75, the rack teeth are formed so that portions that become tooth portions of the rack teeth are higher than the groove portions. Thus, portions of wall move from the side of an outer surface 75a of the tubular member 75 toward the inner surface 75b and therefore, as shown in the drawing, portions of wall swell at the side of the inner surface 75b of the tubular member 75, but portions of wall do not swell at the side of the outer surface 75a of rack teeth. Thus, it is difficult for each tooth portion to have a large height. Therefore, it is difficult to press portions that become tooth tips of the rack teeth against the grooves 72a of the tooth-shaped portion 72 with a sufficient force, so that there is a possibility that the shape of the rack teeth cannot be accurately formed.

SUMMARY OF INVENTION

One object of the invention is to provide a manufacturing method for a hollow rack shaft and a hollow rack shaft that allow the shape of rack teeth to be accurately formed.

An aspect of the invention provides a manufacturing method for a hollow rack shaft, wherein a tubular member, having a planar flat portion formed in part of a tubular body portion, is used as a raw material, and rack teeth are formed at the flat portion to manufacture the hollow rack shaft. The manufacturing method includes: holding the tubular member with a die having a tooth-shaped portion substantially symmetrical with the rack teeth so that a surface of the flat portion is in contact with the tooth-shaped portion, and arranging a back die having protrusions so that the protrusions face groove portions of the tooth-shaped portion across the flat portion; and forming the rack teeth by pressing the back die against the flat portion.

With the above mode, the back die having the protrusions located at positions facing the tooth portions of the rack teeth is pressed against the flat portion to form the rack teeth. That is portions of the flat portion, forming the tooth portions of the rack teeth, are pressed toward the outer surface side of the tubular member. By so doing, the rack teeth are formed so that those portions are higher than the groove portions of the rack teeth. Thus, portions of wall move from the inner surface side of the tubular member toward the outer surface side, so that the portions of wall swell toward the outer surface side of the tubular member. Therefore, the height of each tooth portion of the rack teeth tends to be large. Therefore, portions forming the tooth tips of the tooth portions of the rack teeth are easily pressed against the groove portions of the tooth-shaped portion with a sufficient force. Hence, it is possible to accurately form the shape of the rack teeth.

Another aspect of the invention provides a hollow rack shaft. The hollow rack shaft includes: a tubular body portion; a planar flat portion that is formed in the body portion; rack teeth that are formed in the flat portion; and a back die that is used to form the rack teeth, wherein the back die has a plurality of protrusions that are formed at positions facing tooth portions of the rack teeth, and the back die is fixed to an inner surface of the rack teeth.

By reducing the thickness of the flat portion of the tubular member, the member easily deforms, and moldability of the rack teeth also improves; however, because of the reduction in thickness of the rack shaft, strength against twisting, bending, or the like, decreases. In terms of this point, with the above mode, the back die is fixed to the inner surface of the rack teeth to function as a reinforcement member that reinforces the strength of the hollow rack shaft, so that it is possible to improve moldability of the rack teeth by reducing the thickness of the tubular member, and it is possible to improve the strength of the hollow rack shaft against twisting, bending, or the like.

BRIEF DESCRIPTION OF DRAWINGS

The features, advantages, and technical and industrial significance of this invention will be described below with reference to the accompanying drawings, in which like numerals denote like elements, and wherein.

DETAILED DESCRIPTION OF EMBODIMENTS

Figure 1:
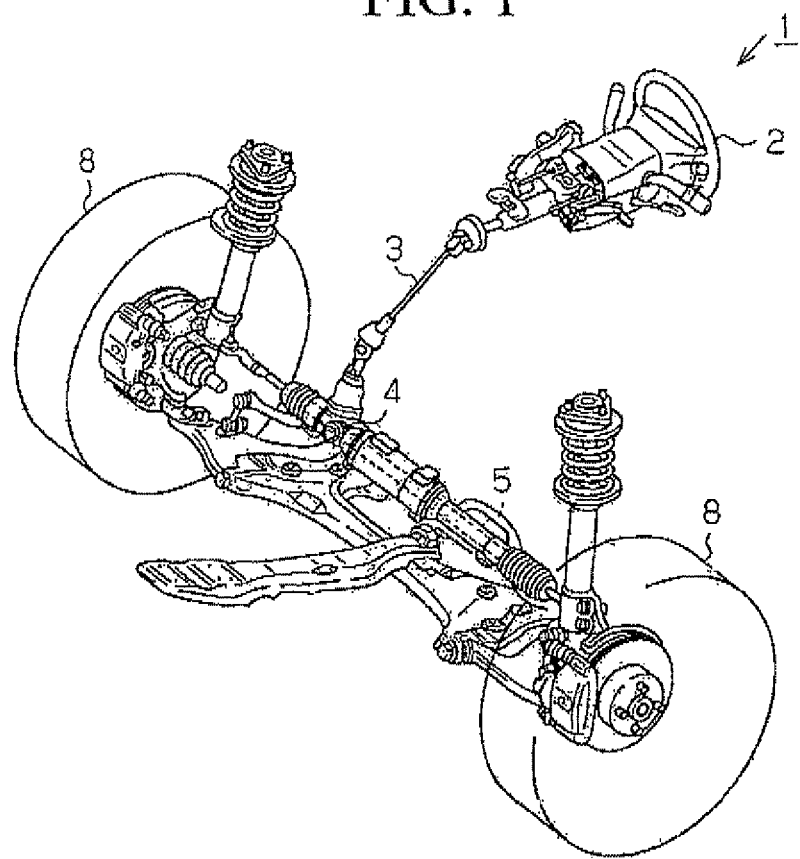
FIG. 1 is a schematic configuration diagram of a vehicle steering system.
Figure 2:
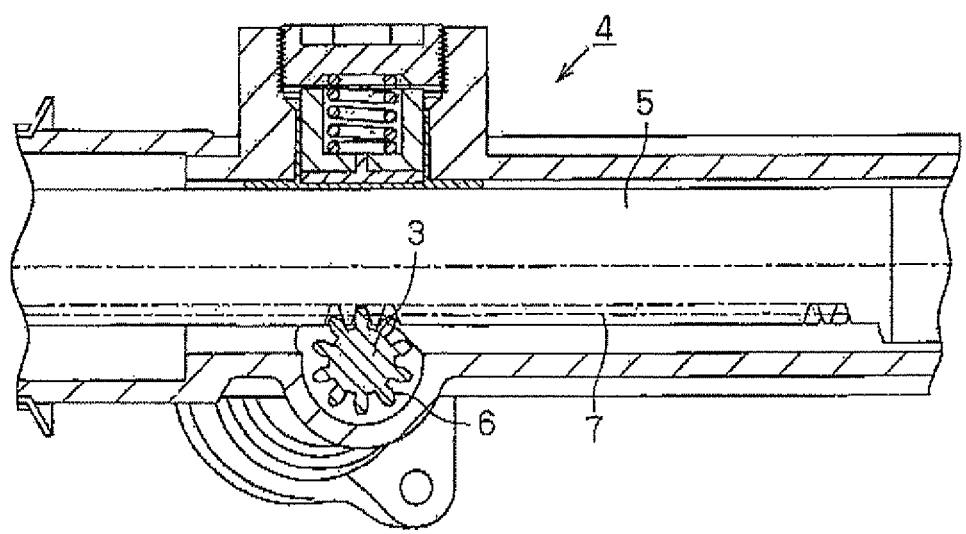
FIG. 2 is a partially sectional view that shows a rack and pinion mechanism.

Hereinafter, a first embodiment of the invention will be described with reference to the accompanying drawings. As shown in FIG. 1, in a vehicle steering system 1, a steering shaft 3 to which a steering wheel 2 is fixed is coupled to a rack shaft 5 via a rack and pinion mechanism 4, and rotation of the steering shaft 3 resulting from steering operation is converted to reciprocating movement of the rack shaft 5 by the rack and pinion mechanism 4. As shown in FIG. 2, the rack and pinion mechanism 4 is formed engaging pinion teeth 6 formed at one end of the steering shaft 3 with, rack teeth 7 of the rack shaft 5. The steered angle of steered wheels 8, that is, the traveling direction of the vehicle, is changed by reciprocating movement of the rack shaft 5 resulting from rotation of the steering shaft 3. The rack teeth 7 of the rack shaft 5 are formed so that the pitch, pressure angle, etc., of the teeth successively vary between the center portion of the rack shaft 5 and both ends of the rack shaft 5 in the axial direction. Thus, the rack shaft 5 is configured as what is called variable gear so that a specific stroke that is the travel of the rack shaft 5 per one rotation of the steering wheel 2 varies with steering angle.

Figure 3:
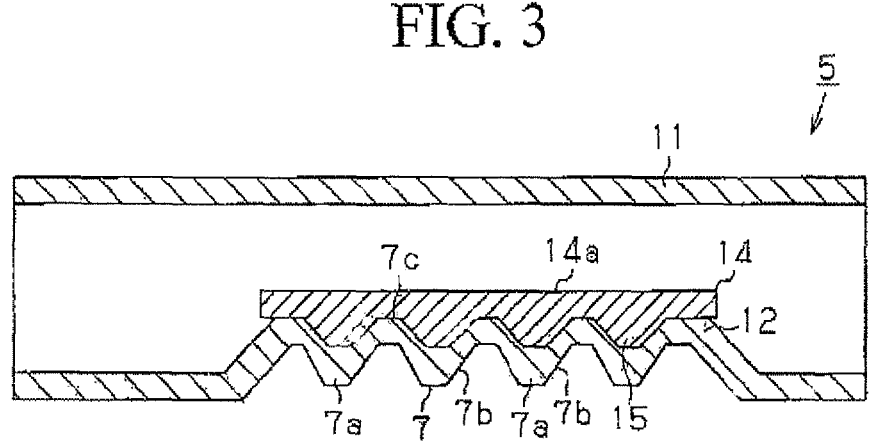
FIG. 3 is a longitudinal sectional view that schematically shows a rack shaft according to a first embodiment.

Next, the configuration of the rack shaft according to the present embodiment will be described. As shown in FIG. 3, the rack shaft 5 is formed as a hollow rack shaft. The rack shaft 5 includes a tubular body portion 11 and a planar flat portion 12 that is formed with the body portion 11, and the rack teeth 7 are formed in the flat portion 12. Note that, in FIG. 3, for the sake of easy description, the number of tooth portions 7a of the rack teeth 7 is reduced to four, and the number of groove portions 7b is reduced to five. In the rack shaft 5, a substantially rectangular back die 14 is fixed to an inner peripheral inner surface 7c of the rack teeth 7. The back die 14 has a plurality of protrusions 15 at positions facing the tooth portions 7a of the rack teeth 7. The protrusions 15 are in contact with the inner surface 7c of the rack teeth 7. The protrusions 15 are formed in a tooth shape corresponding to the tooth portions 7a of the rack teeth 7.

Figure 4:
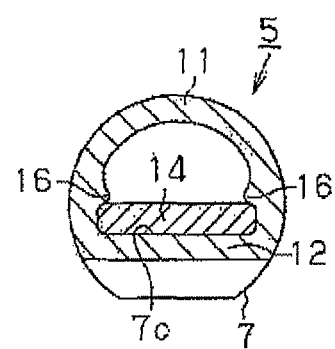
FIG. 4 is a cross-sectional view that schematically shows the rack shaft according to the first embodiment.

As shown in FIG. 4, the body portion 11 of the rack shaft 5 has fixing portions 16. The fixing portions 16 protrude radially inward and are crimped to secure the back die 14 in a state where the back die 14 is in contact with the inner surface 7c of the rack teeth 7. Then, the back die 14 is fixed by the fixing portions 16 in a state where the back die 14 is in contact with the inner surface 7c of the rack teeth 7.

Figure 5:
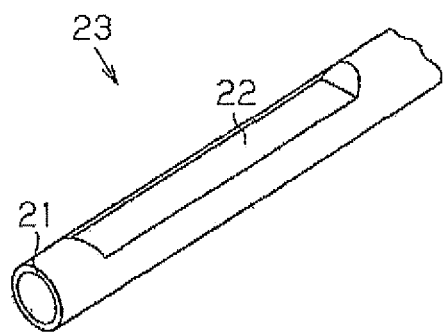
FIG. 5 is a perspective view of a tubular member.
Figure 6:
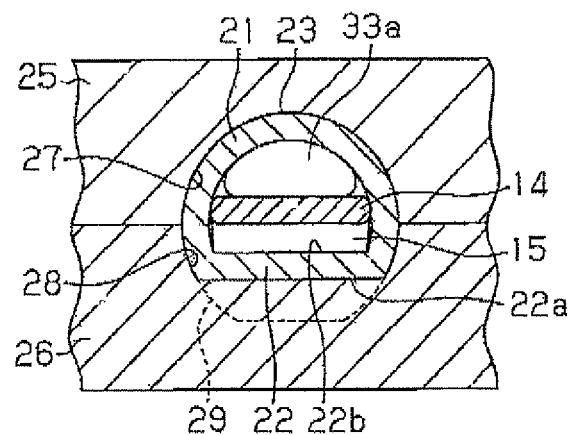
FIG. 6 is a cross-sectional view that schematically shows a state where a tubular member in which rack teeth according to the first embodiment are yet to be formed is held between a cope and a drag.
Figure 7A:
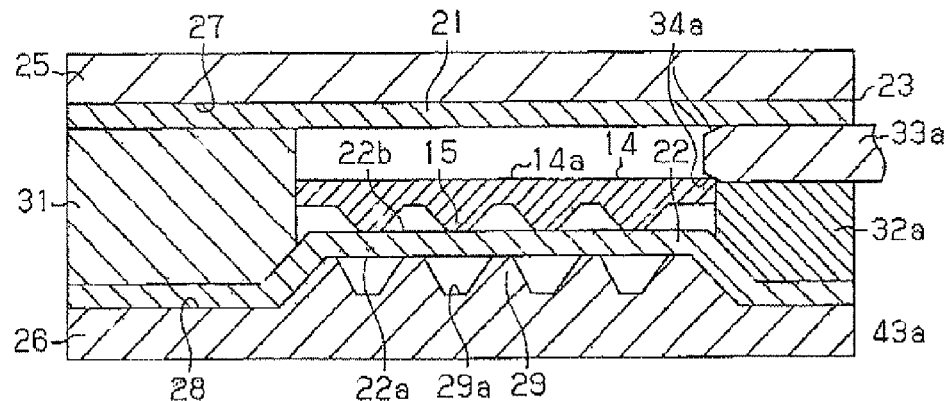
FIG. 7A is a schematic view that shows the process of forming the rack teeth according to the first embodiment.

Next, a manufacturing method for a rack shaft using die forging according to the present embodiment will be described. As shown in FIG. 5, the rack shaft 5 is manufactured using a tubular member 23 as a raw material. In the tubular member 23, a planar flat portion 22 is formed in part of the tubular body portion 21. As shown in FIG. 6 and FIG. 7A, the tubular member 23 is held between a cope 25 and a drag 26 that serve as dies, and the back die 14 is pressed against the flat portion 22 to form the rack teeth 7 to thereby manufacture the rack shaft 5. The body portion 21 of the tubular member 23 corresponds to the body portion 11 of the rack shaft 5, and the flat portion 22 of the tubular member 23 corresponds to the flat portion 12 of the rack shaft 5.

Specifically, the cope 25 and the drag 26 each are formed in a substantially rectangular parallelepiped shape. A semi-circular retention groove 27 having a diameter that is substantially equal to the diameter of the tubular member 23 is formed on a surface of the cope 25, facing the drag 26. A substantially semi-circular retention groove 28 having a diameter that is substantially equal to the diameter of the tubular member 23 is formed on a surface of the drag 26, facing the cope 25, and a tooth-shaped portion 29 substantially symmetrical with the rack teeth 7 is formed at a bottom of the retention groove 28. That is, when the raw material is plastically deformed, spring back occurs and therefore, the tooth-shaped portion 29 is formed in a shape that takes spring back of the rack teeth 7 into consideration. These cope 25 and drag 26 sandwich the tubular member 23 in such a manner that the outer surface 22a of the flat portion 22 is in contact with the tooth-shaped portion 29. By so doing, the cope 25 and the drag 26 hold the tubular member 23 immovably.

Figure 7B:
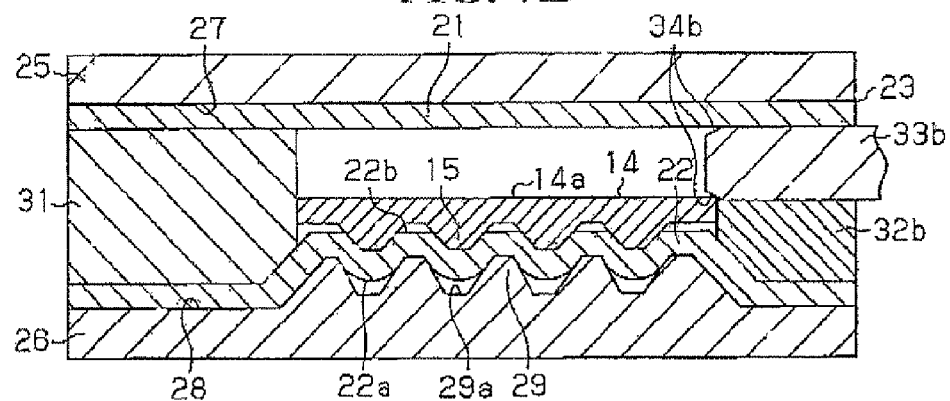
FIG. 7B is a schematic view that shows the process of forming the rack teeth according to the first embodiment.
Figure 7C:
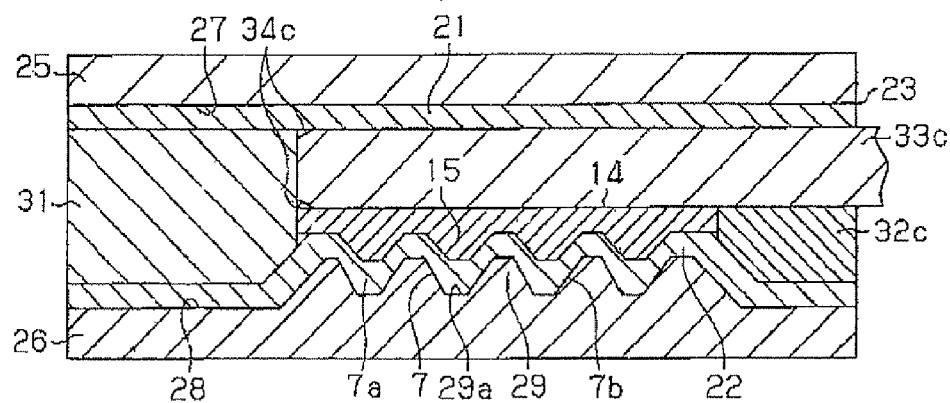
FIG. 7C is a schematic view that shows the process of forming the rack teeth according to the first embodiment.

As shown in FIG. 7A, FIG. 7B and FIG. 7C, a substantially cylindrical jig 31 is inserted into the tubular member 23 from one side (left side in FIG. 7A to FIG. 7C) in the axial direction. In addition, the back die 14 is inserted into the tubular member 23 while the jig 31 is inserted, and one end of the back die 14 in the longitudinal direction (left end in FIG. 7A to FIG. 7C) contacts the jig 31. By so doing, the protrusions 15 are arranged so as to face the groove portions 29a of the tooth-shaped portion 29 across the flat portion 22. After the back die 14 is inserted, substantially semi-cylindrical jigs 32a to 32c are inserted in the tubular member 23 so as to contact the other end of the back die 14 in the longitudinal direction from the other end side (right side in FIG. 7A to FIG. 7C) in the axial direction.

Then, in a state where the tubular member 23 is held by the cope 25 and the drag 26 and the back die 14 is arranged so as to face the groove portions 29a of the tooth-shaped portion 29 across the flat portion 22, mandrels 33a to 33c that serve as pressing members are sequentially inserted from the other end side of the tubular member 23 in the axial direction to thereby press the back die 14 against the flat portion 22 to form the rack teeth 7. The back die 14 is fixed to the inner surface 7c of the rack teeth 7, and the back die 14 and the tubular member 23 are handled as one to manufacture the rack shaft 5.

Specifically, as shown in FIG. 6, the mandrel 33a is formed so that the width of the mandrel 33a in the short-side direction (lateral direction in FIG. 6) perpendicular to the axial direction of the rack shaft 5 and parallel to the flat portion 22 is shorter than the width of the back die 14 in the short-side direction, and gaps are formed between both side ends of the mandrel 33a in the short-side direction and the inner peripheral surface of the body portion 21. The mandrels 33b and 33c are formed so that the width of each of the mandrels 33b and 33c in the short-side direction is substantially equal to the width of the mandrel 33a in the short-side direction, and gaps are formed between both side ends of each of the mandrels 33b and 33c in the short-side direction and the inner peripheral surface of the body portion 21. In addition, the mandrels 33a to 33c are formed so that the thickness (the length in the vertical direction in FIG. 7A to FIG. 7C) of each of the mandrels 33a to 33c is slightly thicker than the distance between the upper surface 14a of the back die 14 and the inner peripheral surface of the tubular member 23 in a state before each of the mandrels 33a to 33c is inserted. Each of the jigs 32a to 320 is formed to have a thickness that allows a corresponding one of the mandrels 33a to 33c to be inserted into the tubular member 23. The jigs 32a to 32c are sequentially inserted into the tubular member 23 before the corresponding mandrels 33a to 33c are inserted. In addition, when the mandrels 33a to 33c are inserted, the jigs 31, 32a to 32e are fixed so as to be immovable in the axial direction, so that movement of the back die 14 accompanying movement of the mandrels 33a to 33e is restricted. The mandrel 33a is the thinnest, and the mandrel 33b and the mandrel 33c become thicker in this order. In addition, tapers 34a to 34c are respectively framed at the distal ends of the mandrels 33a to 33c on the upper and lower surfaces thereof. The tapers 34a to 34c contact the back die 14 to start pushing down the back die 14. For the sake of convenience, the description will be made with three mandrels; however, actually, more mandrels are prepared, and the thickness is increased little by little.

In this way, by inserting the mandrels 33a to 33c each having a thickness that is slightly larger than the distance between the upper surface 14a of the back die 14 and the inner peripheral surface of the tubular member 23, the back die 14 is pressed against the flat portion 22 of the tubular member 23, and then the flat portion 22 is plastically deformed to form the rack teeth 7 to thereby manufacture the rack shaft 5.

Figure 8:
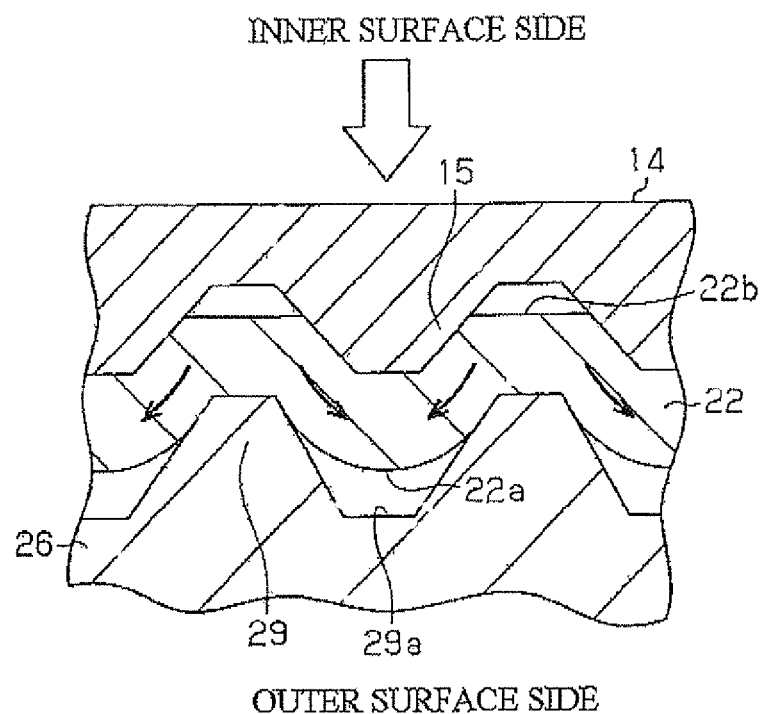
FIG. 8 is a schematic sectional view that shows behavior of portions of wall of the tubular member in a manufacturing method for a hollow rack shaft according to the first embodiment.

As shown in FIG. 8, the back die 14 is pressed against the flat portion 22 to thereby form the rack teeth 7. That is, portions of the flat portion 22, forming the tooth portions 7a of the rack teeth 7, are pushed toward the outer surface 22a. By so doing, the rack teeth 7 are formed so that those portions are higher than the groove portions 7b of the rack teeth 7. This moves portions of wall from the side of the inner surface 22b toward the side of the outer surface 99a, so that the portions of wall swell toward the outer surface side of the tubular member 23. Therefore, the height of each of the tooth portions 7a of the rack teeth 7 tends to increase, and the tooth tips of the tooth portions 7a of the rack teeth 7 are easily pressed against the groove portions 29a of the tooth-shaped portion 29 with a sufficient force.

Figure 9:
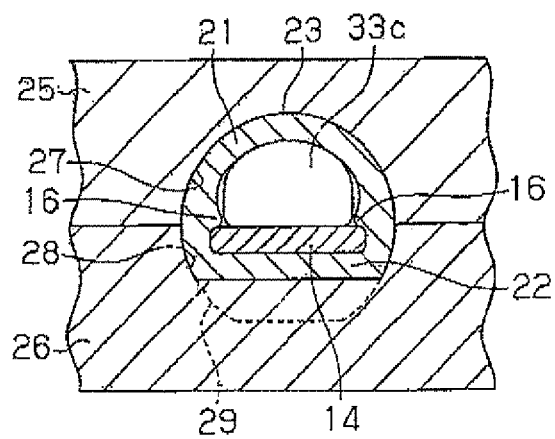
FIG. 9 is a cross-sectional view that schematically shows a state where the tubular member in which the rack teeth according to the first embodiment have been formed is held between the cope and the drag.

In addition, because gaps are formed between both side ends of each of the mandrels 33a to 33c in the short-side direction and the inner peripheral surface of the body portion 21 (see FIG. 6), as shown in FIG. 9, portions of wall also move to the gaps when the rack teeth 7 are formed, so that the fixing portions 16 that are crimped to secure the back die 14 are integrally formed with the body portion 21.

As described above, according to the present embodiment, the following advantageous effects may be obtained.

1) The tubular member 23, in which the planar flat portion 22 is formed in part of the tubular body portion 21, is sandwiched and held between the cope 25 and the drag 26 that has the tooth-shaped portion 29 substantially symmetrical with the rack teeth 7 so that the outer surface 22a of the flat portion 22 is in contact with the tooth-shaped portion 29. Then, the back die 14 having the plurality of protrusions 15 is arranged so that the protrusions 15 face the groove portions 29a of the tooth-shaped portion 29 across the flat portion 22, and the back die 14 is pressed against the flat portion 22 to form the rack teeth 7 to thereby manufacture the rack shaft 5.

With the above configuration, portions of the flat portion 22, forming the tooth portions 7a of the rack teeth 7, are pushed toward the side of the outer surface 22a. By so doing, the rack teeth 7 are formed so that those portions are higher than the groove portions 7b of the rack teeth 7. Therefore, portions of wall move from the side of the inner surface 22b toward the side of the outer surface 22a. Thus, portions of wall swell toward the side of the outer surface 22a of the tubular member 23, so that the height of each of the tooth portions 7a of the rack teeth 7 tends to increase, and portions that become the tooth tips of the tooth portions 7a of the rack teeth 7 are easily pressed against the groove portions 29a of the tooth-shaped portion 29 with a sufficient force. Hence, it is possible to accurately form the shape of the rack teeth 7.

2) The back die 14 is fixed to the inner surface 7c of the rack teeth 7, and the back die 14 and the tubular member 23 are handled as one to manufacture the rack shaft 5. With the above configuration, the back die 14 is fixed integrally with the tubular member 23, so that the same back die 14 is not repeatedly used when the rack shaft 5 is manufactured. Therefore, it is not necessary to apply surface treatment for improving, for example, wear resistance, or the like, unlike a die repeatedly used in general pressing work, or the like, so that it is possible to reduce cost for manufacturing the back die 14.

3) The back die 14 is pressed against the flat portion 22 in a state where gaps are formed between both ends of each of the mandrels 33a to 33c in the short-side direction and the inner peripheral surface of the body portion 21. By so doing, the rack teeth 7 are formed, and the fixing portions 16 that fix the back die 14 to the inner surface 7c of the rack teeth 7 are integrally formed with the body portion 21. With the above configuration, because the back die 14 is pressed against the flat portion 22 in a state where gaps are formed between both ends of each of the mandrels 33a to 33c in the short-side direction and the inner peripheral surface of the tubular member 23, portions of wall also move to the gaps when the rack teeth 7 are formed, so that the fixing portions 16 that are crimped to secure the back die 14 are integrally formed with the body portion 21. Therefore, for example, different from the case where the back die 14 is fixed by adhesive agent, or the like, the back die 14 may be fixed to the inner surface 7e of the rack teeth 7 without increasing the number of components or the number of work processes.

4) The rack shaft 5 includes the tubular body portion 11 and the planar flat portion 12 that is formed in the body portion 11, and the rack teeth 7 are formed in the flat portion 12. Then, the back die 14 having the protrusions 15 that are located to face the tooth portions 7a of the rack teeth 7 is fixed to the inner surface 7c of the rack teeth 7.

Here, by reducing the thickness of the tubular member 23 (flat portion 22), the member easily deforms, and moldability of the rack teeth 7 also improves; however, because of the reduction in thickness of the rack shaft 5, strength against twisting, bending, or the like, decreases. In terms of this point, with the above configuration, the back die 14 is fixed to the inner surface 7c of the rack teeth 7 to function as a reinforcement member that reinforces the strength of the rack shaft 5, so that it is possible to improve moldability of the rack teeth 7 by reducing the thickness of the tubular member 23, and it is possible to improve the strength of the rack shaft 5 against twisting, bending, or the like.

5) Because the fixing portions 16 that are crimped to secure the back die 14 are integrally formed with the body portion 11, in comparison with the case where the back die 14 is fixed by, for example, adhesive agent, or the like, the back die 14 is fixed to the inner surface 7c of the rack teeth 7 without increasing the number of components.

Hereinafter, a second embodiment of the invention will be described with reference to the accompanying drawings. Note that a manufacturing method according to the present embodiment mainly differs from the manufacturing method according to the first embodiment in that the back die is removed after the rack teeth are formed. Therefore, for the sake of easy description, like reference numerals denote components similar to those of the first embodiment, and the description thereof is omitted.

Figure 10A:
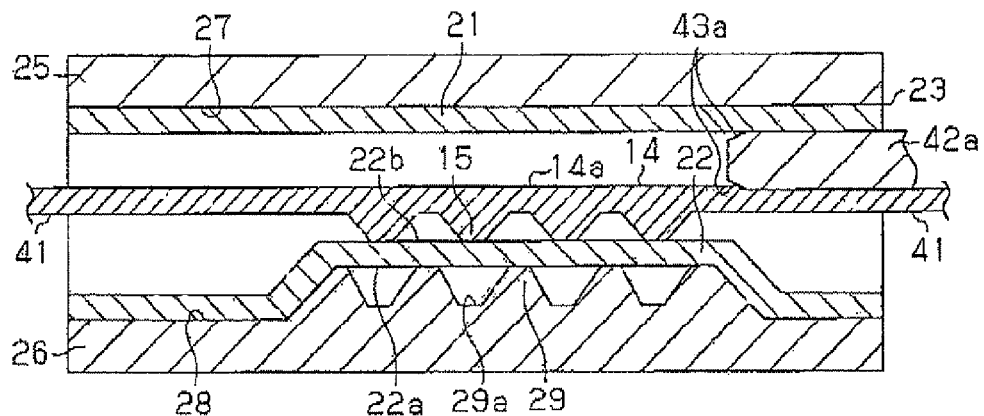
FIG. 10A is a schematic view that shows the process of forming rack teeth according to a second embodiment.
Figure 10B:
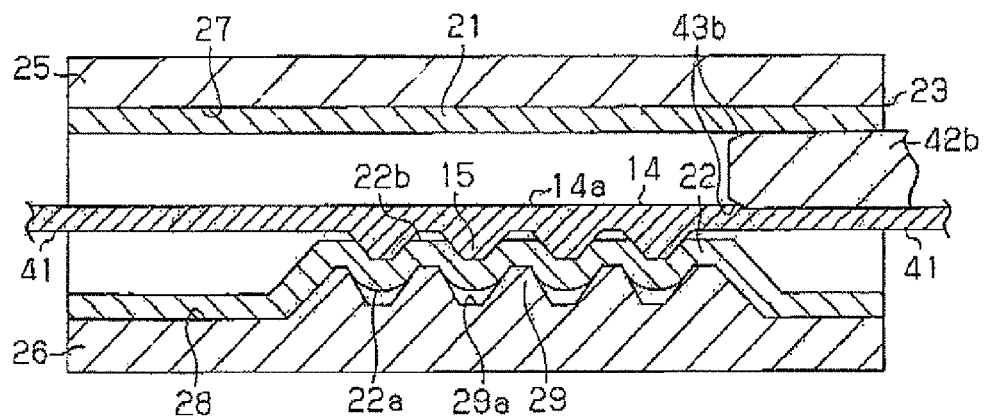
FIG. 10B is a schematic view that shows the process of forming the rack teeth according to the second embodiment.
Figure 10C:
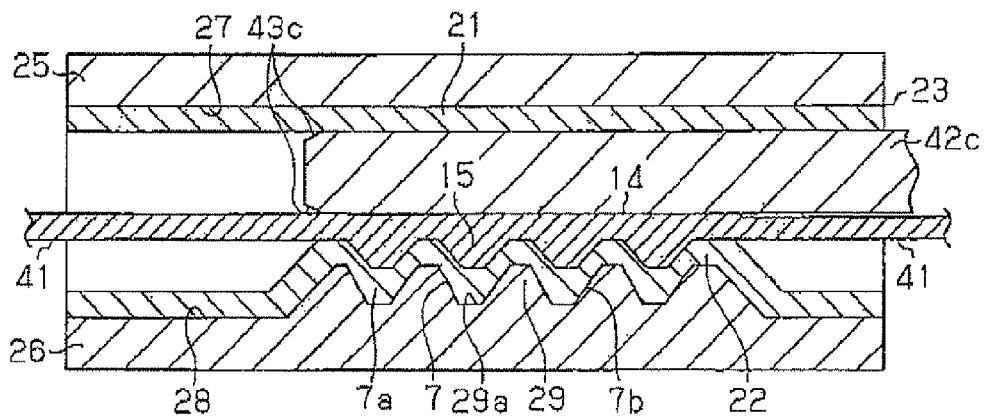
FIG. 10C is a schematic view that shows the process of forming the rack teeth according to the second embodiment.

As shown in FIG. 10A, FIG. 10B and FIG. 10C, the back die 14 has extended portions 41 that respectively extend from both ends in the longitudinal direction and that protrude outward of the tubular member 23. Note that the back die 14 is fixedly arranged with respect to the cope 25 and the drag 26 so that the protrusions 15 face the groove portions 29a of the tooth-shaped portion 29 across the flat portion 22.

Figure 11:
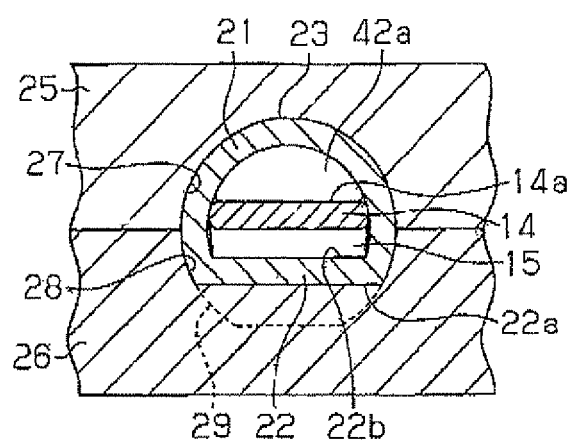
FIG. 11 is a cross-sectional view that schematically shows a state where a tubular member in which the rack teeth according to the second embodiment are yet to be formed is held between a cope and a drag.

In addition, as shown in FIG. 11, a mandrel 42a is formed in a shape that fills a gap between the upper surface 14a of the back die 14 and the inner peripheral surface of the body portion 21. Each of the mandrels 42b and 42c is also formed in a shape that fills a gap between the upper surface 14a of the back die 14 and the inner peripheral surface of the body portion 21. These mandrels 42a to 42c are formed so that the thickness of each of these mandrels 42a to 42c is slightly larger than the distance between the upper surface 14a of the back die 14 and the inner peripheral surface of the tubular member 23 in a state before each of the mandrels 42a to 42c is inserted. The mandrel 42a is the thinnest, and the mandrel 42b and the mandrel 42c become thicker in this order. Tapers 43a to 43c are respectively formed at the distal ends of the mandrels 42a to 42c on the upper and lower surfaces thereof. The tapers 43a to 43c contact the back die 14 to start pushing down the back die 14. Note that, for the sake of convenience, the description will be made with three mandrels; however, actually, more mandrels are prepared, and the thickness is increased little by little.

Then, as in the case of the first embodiment, in a state where the tubular member 23 is held by the cope 25 and the drag 26 and the back die 14 is arranged so as to be in contact with the inner surface 22b of the flat portion 22, as shown in FIG. 10A, FIG. 10B and FIG. 10C, the mandrels 42a to 42c are inserted one by one to press the back die 14 against the flat portion 22 to thereby form the rack teeth 7, thus manufacturing the rack shaft 5.

Figure 12:
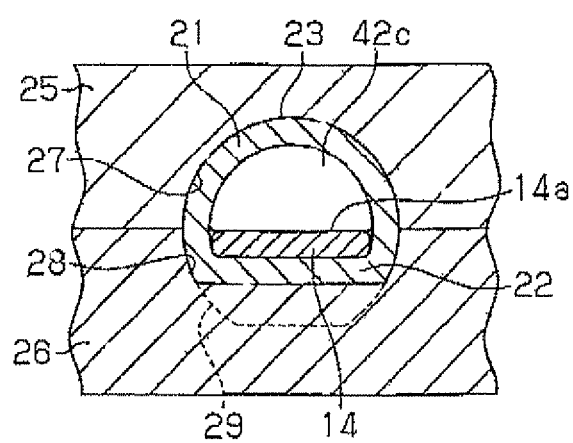
FIG. 12 is a cross-sectional view that schematically shows a state where the tubular member in which the rack teeth according to the second embodiment have been formed is held between the cope and the drag.
Figure 13:
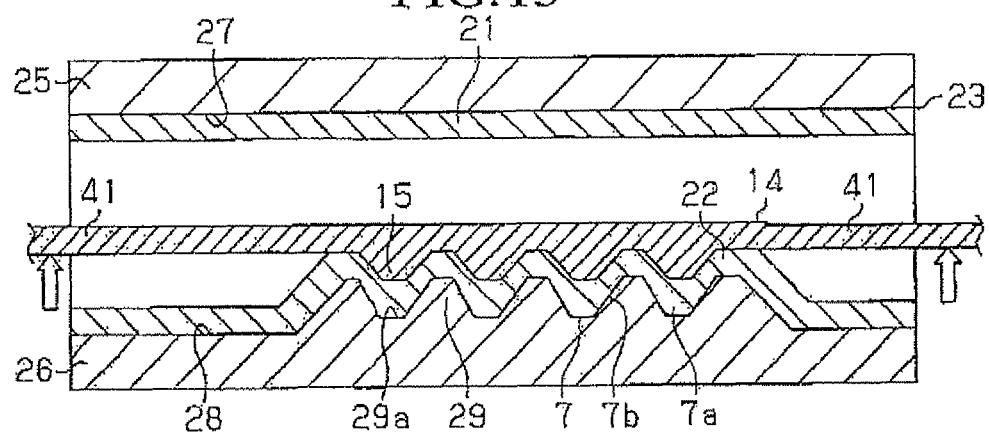
FIG. 13 is a schematic view that shows the process of removing a back die after the rack teeth are formed.
Figure 14:
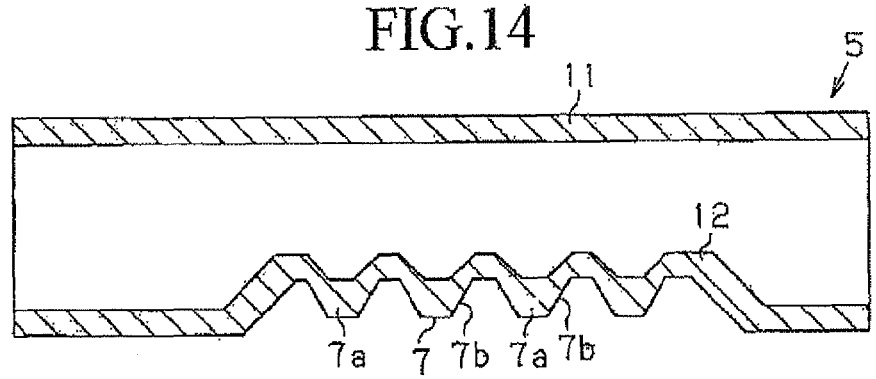
FIG. 14 is a longitudinal sectional view that schematically shows the rack shaft according to the second embodiment.

Here, each of the mandrels 42a to 42c is formed to fill a gap between the upper surface 14a of the back die 14 and the inner peripheral surface of the body portion 21 and therefore, as shown in FIG. 12, when the rack teeth 7 are formed, portions of wall do not move toward both sides of the mandrel 42c in the short-side direction, and no fixing portions 16 (see FIG. 9) that fix the back die 14 are formed. That is, the back die 14 is not fixed to the inner surface 7c of the rack teeth 7. In the present embodiment, after the rack teeth 7 are formed, as shown in FIG. 13, the extended portions 41 of the back die 14 are pushed upward as indicated by the outline arrows to remove the back die 14 to thereby manufacture the rack shaft 5 as shown in FIG. 14.

As described above, according to the present embodiment, the same advantageous effect as that of 1) in the first embodiment is obtained. Note that the above embodiments may be appropriately modified into the following alternative embodiments.

In the first embodiment, the fixing portions 16 that are integrally formed with the body portion 11 are crimped to secure the back die 14 to the inner surface 7c of the rack teeth 7. However, the configuration is not limited to this. It is also applicable that no fixing portions 16 are formed and, for example, adhesive agent is interposed between the back die 14 and the flat portion 22 of the tubular member 23 to thereby fix the back die 14 to the inner surface 7c of the rack teeth 7.

Figure 15:
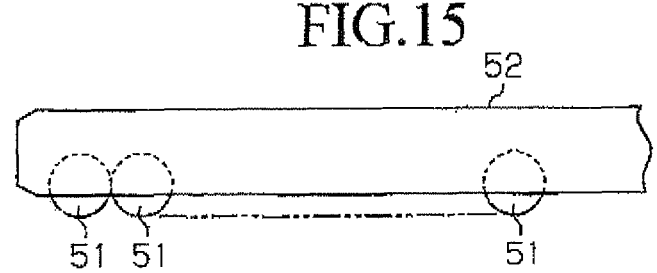
FIG. 15 is a side view that shows another mandrel.

In the above embodiments, instead of the mandrels 33a to 33c and 42a to 42c, it is also applicable that, as shown in FIG. 15, a mandrel 52 that has a plurality of rollable rollers 51 arranged parallel to one another in the longitudinal direction is used. With the above configuration, when the mandrel 52 is inserted into the tubular member 23, the rollers 51 roll to make it possible to reduce sliding resistance between the mandrel 52 and the back die 14.

Figure 16:
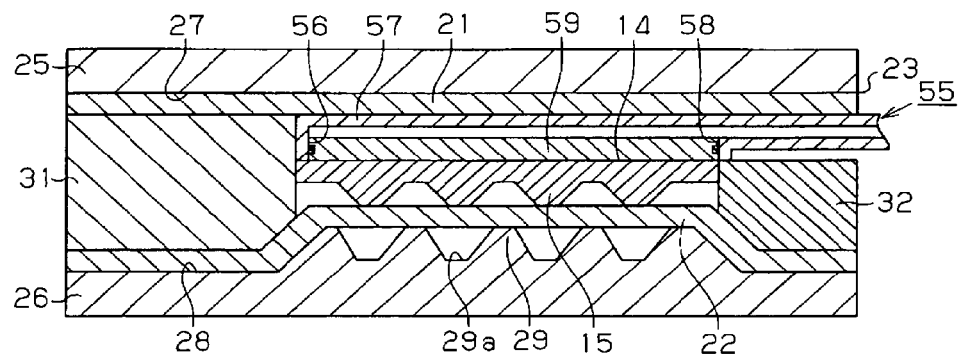
FIG. 16 is a schematic view that shows a state where a back die is pressed against a flat portion of the tubular member by a hydraulic cylinder.
Figure 17:
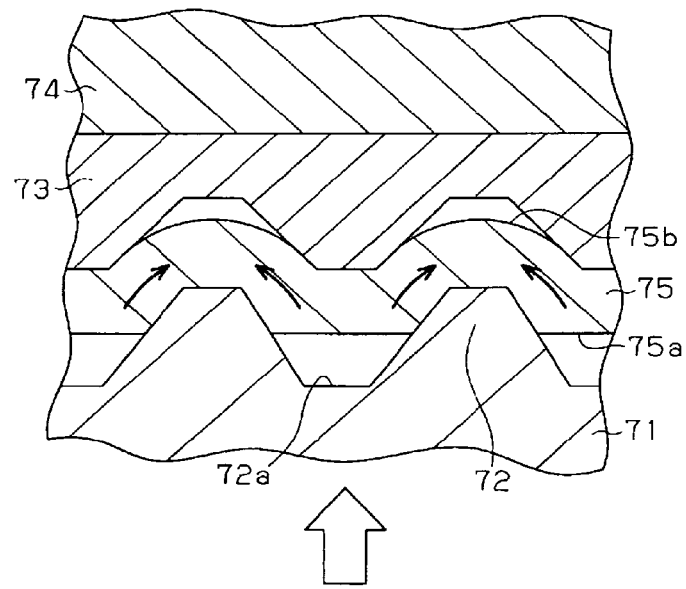
FIG. 17 is a schematic sectional view that shows behavior of portions of wall of a tubular member in an existing manufacturing method for a hollow rack shaft.

In the above embodiments, the mandrels 33a to 33c and 42a to 42c are inserted into the tubular member 23 to press the back die 14 against the flat portion 22; however, the configuration is not limited to this. It is also applicable that the back die 14 is pressed against the flat portion 22 by another method. For example, as shown in FIG. 16, it is applicable that a hydraulic cylinder 55 is inserted into the tubular member 23 and then the hydraulic cylinder 55 is used to press the back die 14 against the flat portion 22. Specifically, the hydraulic cylinder 55 includes a cylinder case 57 that has a guide hole 56, and a piston 59 that serves as a pressing member provided in the guide hole 56 via a seal member 58, and the piston 59 is moved by hydraulic pressure supplied into the cylinder case 57 to thereby press the back die 14 against the flat portion 22.

In the above embodiments, the protrusions 15 of the back die 14 are formed in a tooth-shaped portion corresponding to the tooth portions 7a of the rack teeth 7; however, the configuration is not limited to this. It suffices that the protrusions 15 have a shape that protrudes toward the flat portion 22 of the tubular member 23, and the protrusions 15 may be for example, formed in a circular arc shape.

In the above embodiments, the aspect of the invention is applied to the variable gear rack shaft 5 in which the pitch, pressure angle, and the like, of teeth successively vary between the center portion of the rack shaft 5 and both ends of the rack shaft 5 in the axial direction; however, the aspect of the invention is not limited to this. The invention may be applied to a rack shaft in which the pitch, pressure angle, and the like, of teeth are constant.

What is claimed is:

1. A manufacturing method for a hollow rack shaft comprising:
using a tubular member as a raw material, having a planar flat portion formed in part of a tubular body portion; and forming rack teeth at the flat portion; wherein
the tubular member is held with a back die having a tooth-shaped portion substantially symmetrical with the rack teeth so that a surface of the flat portion is in contact with the tooth-shaped portion, the back die having protrusions is arranged so that the protrusions face groove portions of the tooth-shaped portion across the flat portion, the rack teeth are formed by pressing the back die against the flat portion such that a surface of the back die opposite the plurality of protrusions and an inner peripheral surface of the tubular body portion define a hollow gap therebetween, and the surface of the back die opposite the plurality of protrusions is parallel to the planar flat portion.

2. The manufacturing method for a hollow rack shaft according to claim 1, wherein the back die is fixed to an inner surface of the rack teeth, and the back die and the tubular member are handled as one to manufacture the hollow rack shaft.

3. The manufacturing method for a hollow rack shaft according to claim 2, wherein in a state where gaps are formed between an inner peripheral surface of the body portion and both side ends of a pressing member for pressing the back die in a short-side direction that is perpendicular to an axial direction of the rack shaft and is parallel to the flat portion, the back die is pressed against the flat portion to form the rack teeth and to form, integrally with the body portion, a fixing portion that fixes the back die to the inner surface of the rack teeth.

4. A hollow rack shaft comprising:

a tubular body portion;

a planar flat portion that is formed in the body portion;

rack teeth that are formed in the flat portion; and a back die that is used to form the rack teeth, wherein the back die has a plurality of protrusions that are formed at positions facing tooth portions of the rack teeth, the back die is fixed to an inner surface of the rack teeth, a surface of the back die opposite the plurality of protrusions and an inner peripheral surface of the tubular body portion define a hollow gap therebetween, and the surface of the back die opposite the plurality of protrusions is parallel to the planar flat portion.

5. The hollow rack shaft according to claim 4, wherein the body portion has a fixing portion that protrudes toward an inner peripheral side of the body portion and that is crimped to secure the back die, wherein the back die is fixed to the inner surface of the rack teeth by the fixing portion.

* * * * *